(12) United States Patent
Wu

(10) Patent No.: US 7,419,034 B1
(45) Date of Patent: Sep. 2, 2008

(54) V-TYPE BRAKE

(75) Inventor: Leo Wu, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 11/808,837

(22) Filed: Jun. 13, 2007

(51) Int. Cl.
*B62L 3/00* (2006.01)

(52) U.S. Cl. ............... 188/24.21; 188/24.12; 188/24.22

(58) Field of Classification Search .... 188/24.11–24.22
See application file for complete search history.

(56) References Cited

U.S. PATENT DOCUMENTS

| | | | | |
|---|---|---|---|---|
| 2,699,228 A | * | 1/1955 | Mennesson | 188/24.19 |
| 3,628,635 A | * | 12/1971 | Yoshigai | 188/6 |
| 4,391,352 A | * | 7/1983 | Brown | 188/24.12 |
| 4,489,813 A | * | 12/1984 | Albonico | 188/24.21 |
| 4,553,641 A | * | 11/1985 | Scott et al. | 188/24.22 |
| 4,591,026 A | * | 5/1986 | Nagano | 188/2 D |
| D340,902 S | * | 11/1993 | Mele | D12/179 |
| 5,743,284 A | * | 4/1998 | Lumpkin | 188/24.22 |
| 6,302,242 B1 | * | 10/2001 | Mao | 188/24.21 |

* cited by examiner

*Primary Examiner*—Christopher P Schwartz
(74) *Attorney, Agent, or Firm*—Harness, Dickey & Pierce, P.L.C.

(57) ABSTRACT

A V-type brake is adapted to slow down or stop a wheel, and includes a pair of first and second brake arms, a brake cable assembly connected to a free end of the second brake arm, and a linkage. The linkage is connected pivotally to a free end of the first brake arm, and is interconnected between the free end of the first brake arm and the brake cable assembly in such a manner that the linkage is in a folded state. The linkage is operable to unfold so as to pivot the free ends of the first and second brake arms away from each other, thereby increasing the distance between brake shoes on the first and second brake arms for removal or remounting of the wheel.

14 Claims, 8 Drawing Sheets

V-TYPE BRAKE

BACKGROUND OF THE INVENTION

1. Field of the Invention

This invention relates to a brake, and more particularly to a V-type brake for slowing down or stopping a wheel.

2. Description of the Related Art

Referring to FIGS. 1 and 2, a conventional V-type brake 2 is adapted for slowing down or stopping a wheel 1, and includes a first brake arm 21, a second brake arm 22, a tube-fastening seat 23 connected pivotally to a free end 211 of the first brake arm 21, a curved tube 24 fastened removably to the tube-fastening seat 23, a brake cable 25 extending through the curved tube 24 and having an end fastened to a free end 221 of the second brake arm 22, and a pair of brake shoes 26 disposed respectively on inner sides of the first and second brake arms 21, 22 and pivotable into contact with the wheel 1.

When it is necessary to remove the wheel 1 or remount the wheel 1 after removal, the operator needs to move the free ends 211, 221 of the first and second brake arms 21, 22 with one hand and remove the curved tube 24 from the tube-fastening seat 23 with the other hand, thereby resulting in difficulties in removing or remounting the wheel 1.

SUMMARY OF THE INVENTION

The object of this invention is to provide a V-type brake for slowing down or stopping a wheel, which can be operated easily to allow for convenient removal or remounting of the wheel.

Accordingly, a V-type brake of this invention is adapted to slow down or stop a wheel, and includes a pair of first and second brake arms, a brake cable assembly connected to a free end of the second brake arm, and a linkage. The linkage is connected pivotally to a free end of the first brake arm, and is interconnected between the free end of the first brake arm and the brake cable assembly in such a manner that the linkage is in a folded state. The linkage is operable to unfold so as to pivot the free ends of the first and second brake arms away from each other, thereby increasing the distance between brake shoes on the first and second brake arms for removal or remounting of the wheel.

To change the distance between the brake shoes, the operator can fold or unfold the linkage using only a single hand. Thus, the V-type brake can be operated with ease.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
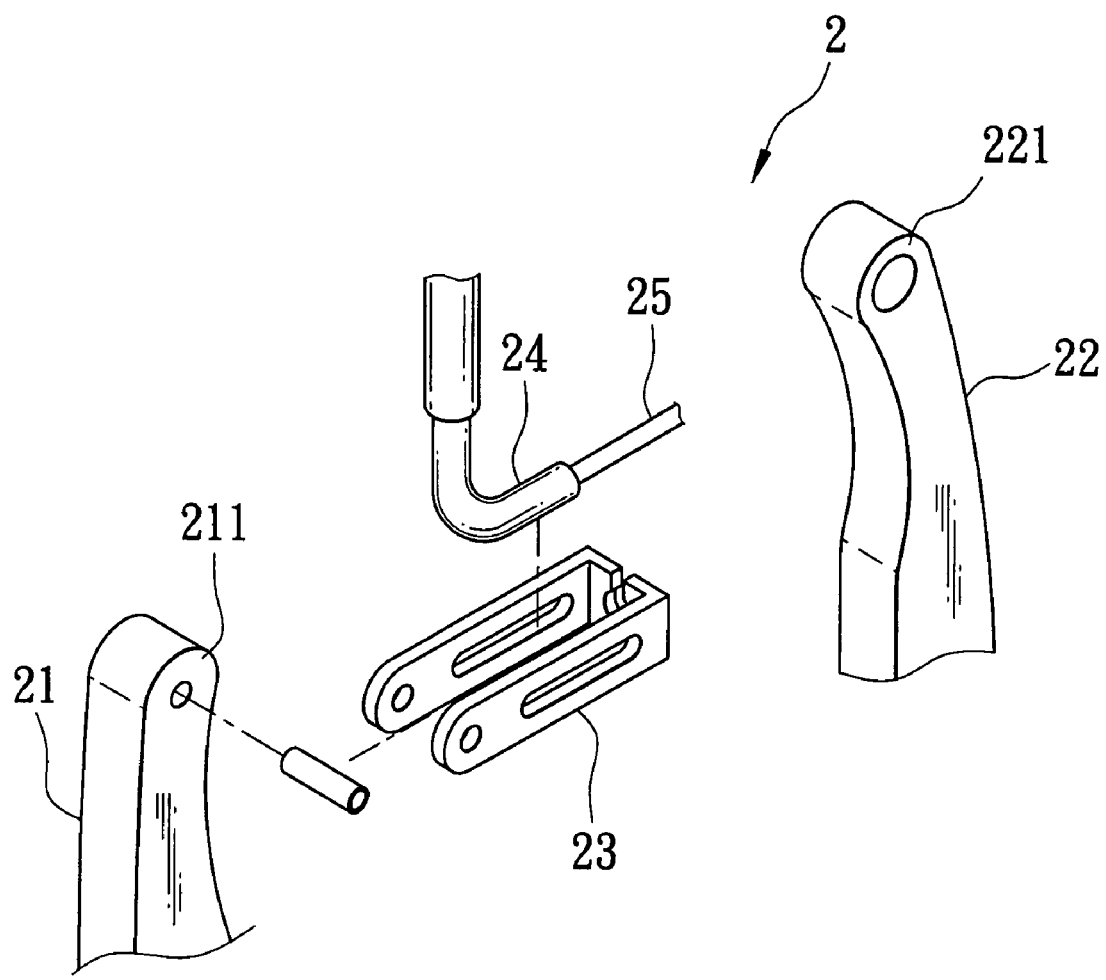
FIG. 1 is a fragmentary exploded perspective view of a conventional V-type brake.
Figure 2:
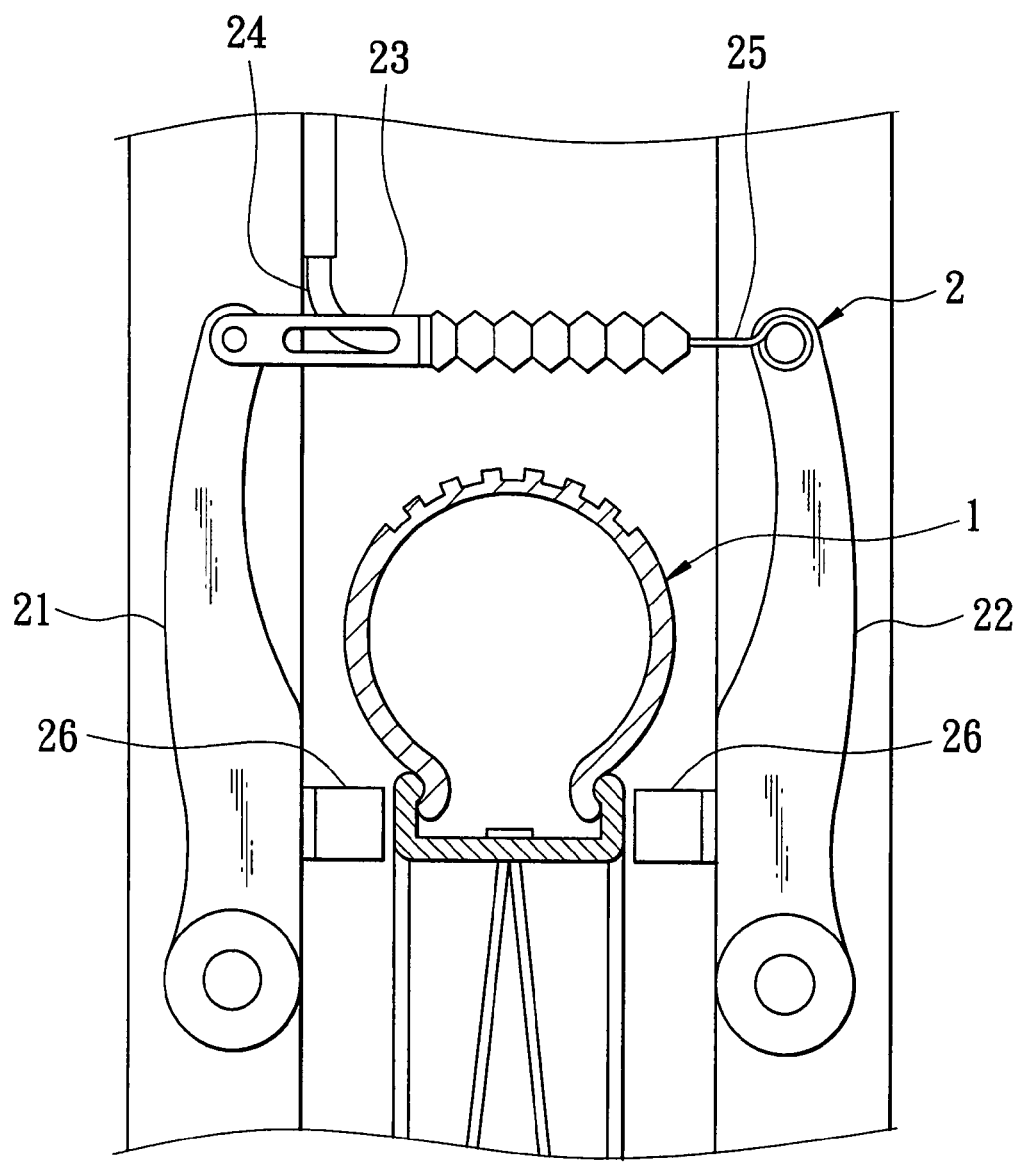
FIG. 2 is a front view of the conventional V-type brake.
Figure 3:
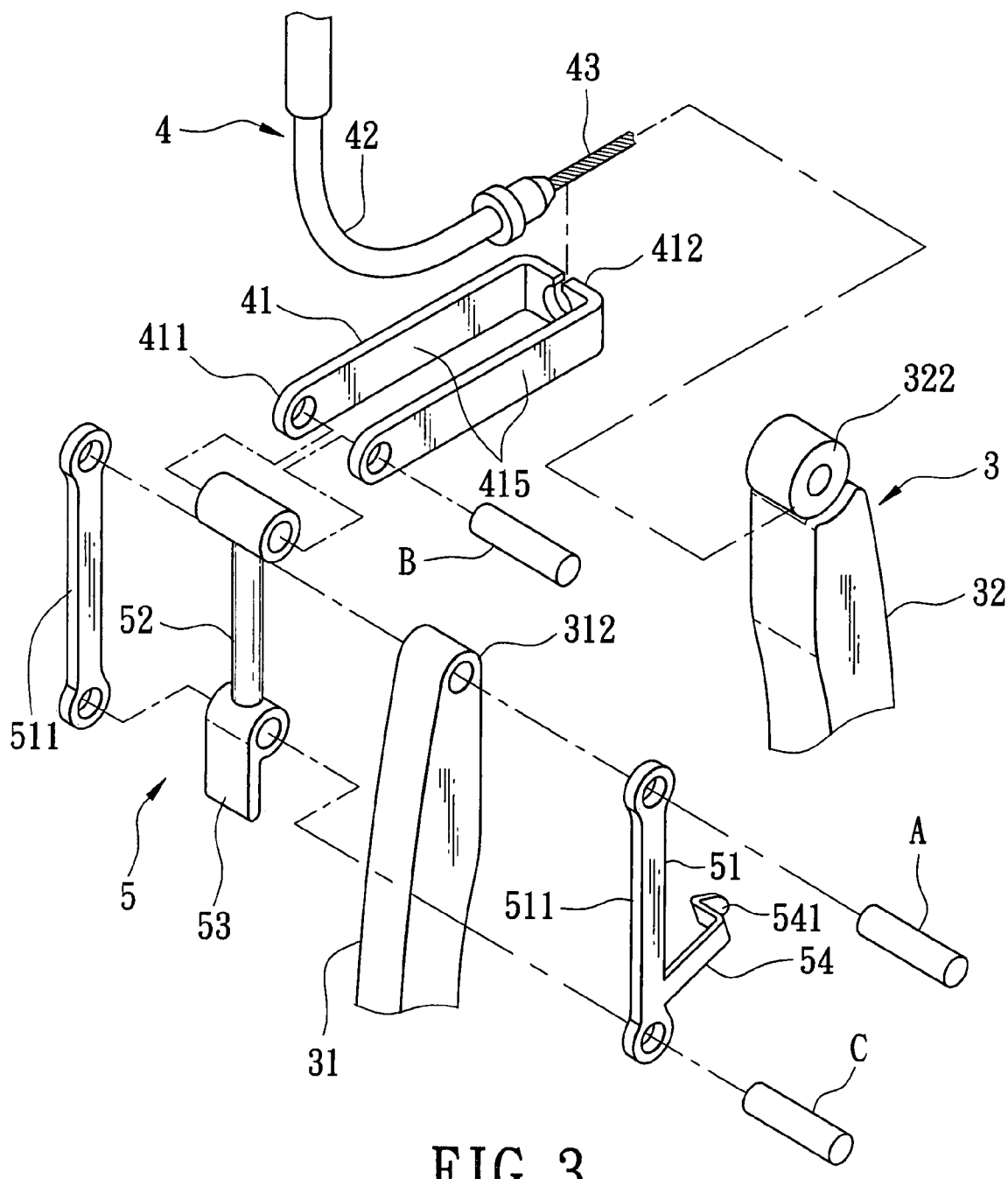
FIG. 3 is a fragmentary exploded perspective view of the preferred embodiment of a V-type brake according to this invention.
Figure 4:
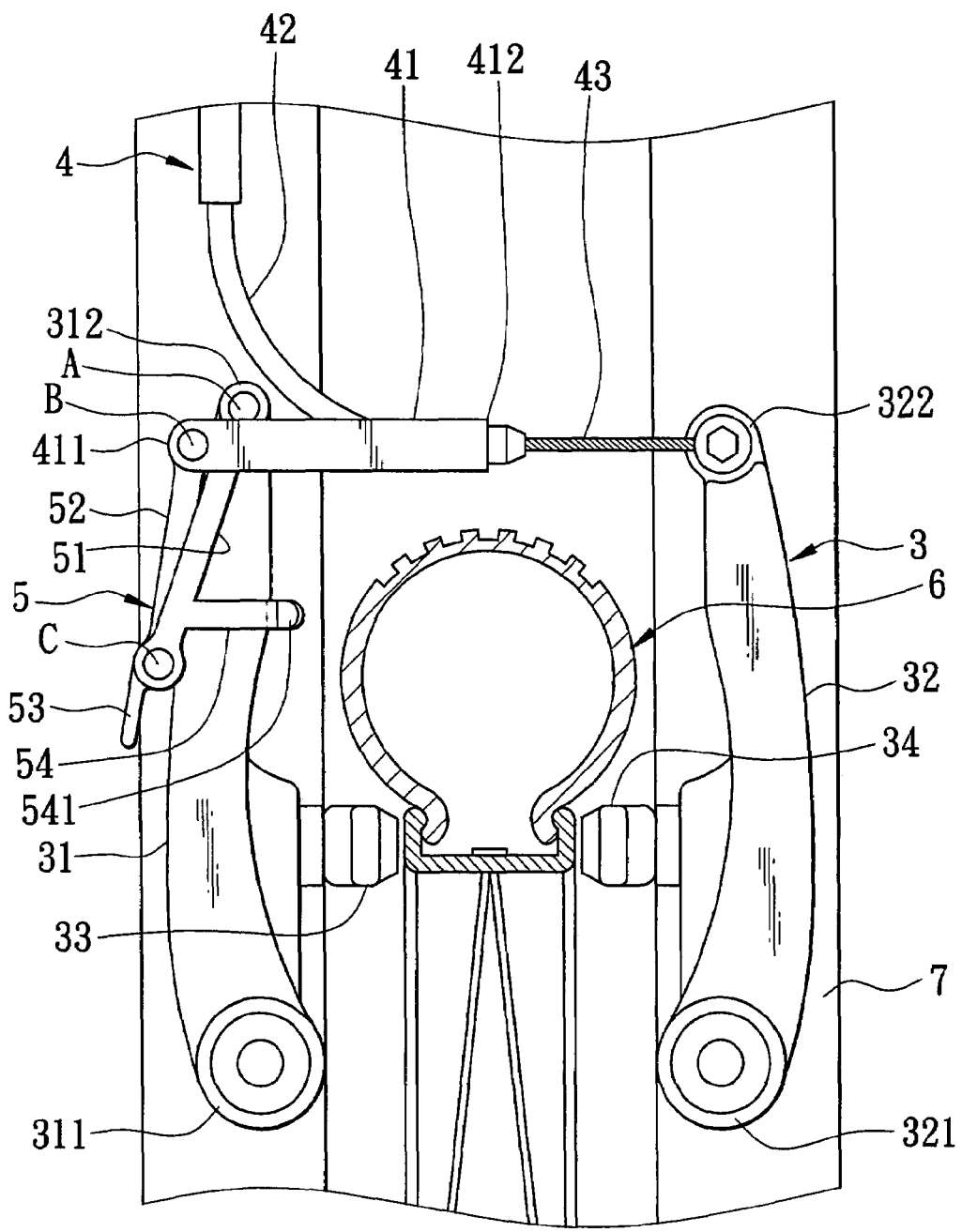
FIG. 4 is a front view of the preferred embodiment.

Referring to FIGS. 3 and 4, the preferred embodiment of a V-type brake according to this invention is used to slow down or stop a wheel 6, and includes a brake arm unit 3, a brake cable assembly 4, and a linkage 5.

The brake arm unit 3 includes a pair of first and second brake arms 31, 32 each having a pivot end 311, 321 connected pivotally to a frame body 7, and a free end 312, 322. The first and second brake arms 31, 32 are provided respectively with a pair of first and second brake shoes 33, 34 on inner sides thereof in a known manner. The free ends 312, 322 of the first and second brake arms 31, 32 are biased to pivot away from each other in a known manner.

The brake cable assembly 4 includes a tube-fastening seat 41, a curved tube 42, and a brake cable 43. The tube-fastening seat 41 is generally U-shaped, and has a first end 411 connected to the linkage 5, and a second end 412 for fastening removably the curved tube 42 in a known manner. The brake cable 43 extends through the curved tube 42, and is fastened to the free end 322 of the second brake arm 32 in a known manner.

Figure 5:
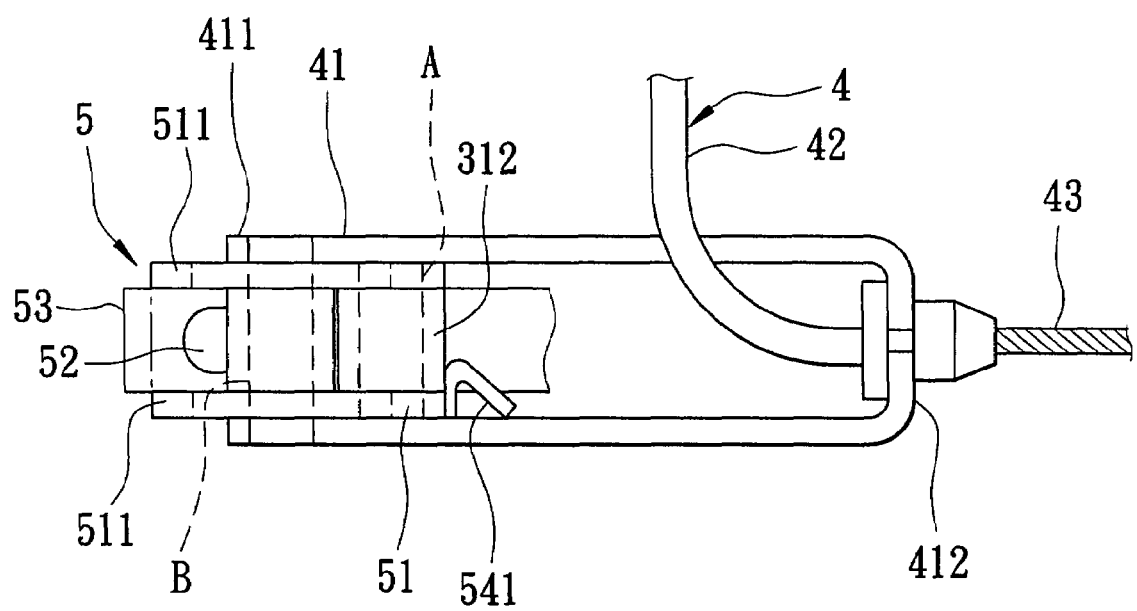
FIG. 5 is a schematic top view of the preferred embodiment when a linkage is in a folded state.

The linkage 5 includes a first link member 51, a second link member 52, a push plate 53, a safety hook 54, a first pivot (A), a second pivot (B), and a third pivot (C). The first link member 51 includes two parallel link rods 511, and has an end connected pivotally to the free end 312 of the first brake arm 31 by the first pivot (A). An end of the second link member 52 is connected pivotally to the first end 411 of the tube-fastening seat 41 by the second pivot (B). The other end of the first link member 51 is connected pivotally to the other end of the second link member 52 by the third pivot (C). The distance between the first and third pivots (A, C) is greater than that between the second and third pivots (B, C). The push plate 53 extends integrally from an end of the second link member 52 adjacent to the third pivot (C) in a direction away from the other end of the second link member 52. When the brake cable 43 is not actuated, the linkage 5 is in a folded state, as shown in FIG. 4. With further reference to FIG. 5, in the folded state, the first pivot (A) is higher than the second pivot (B) and disposed between two parallel side walls (41S), the second and third pivots (B, C) are in contact with the first brake arm 31, and the free end 312 of the first brake arm 31 is disposed between the first pivot (A) and the free end 322 of the second brake arm 32. As such, the first pivot (A) prevents movement of the second pivot (B) and, thus, the tube-fastening seat 41. The safety hook 54 is formed integrally with one of the link rods 511 of the first link member 51, and has a hook end 541 engaging removably the first brake arm 31 so as to maintain the linkage 5 in the folded state. The safety hook 54 is operable so as to separate from the first brake arm 31.

Figure 6:
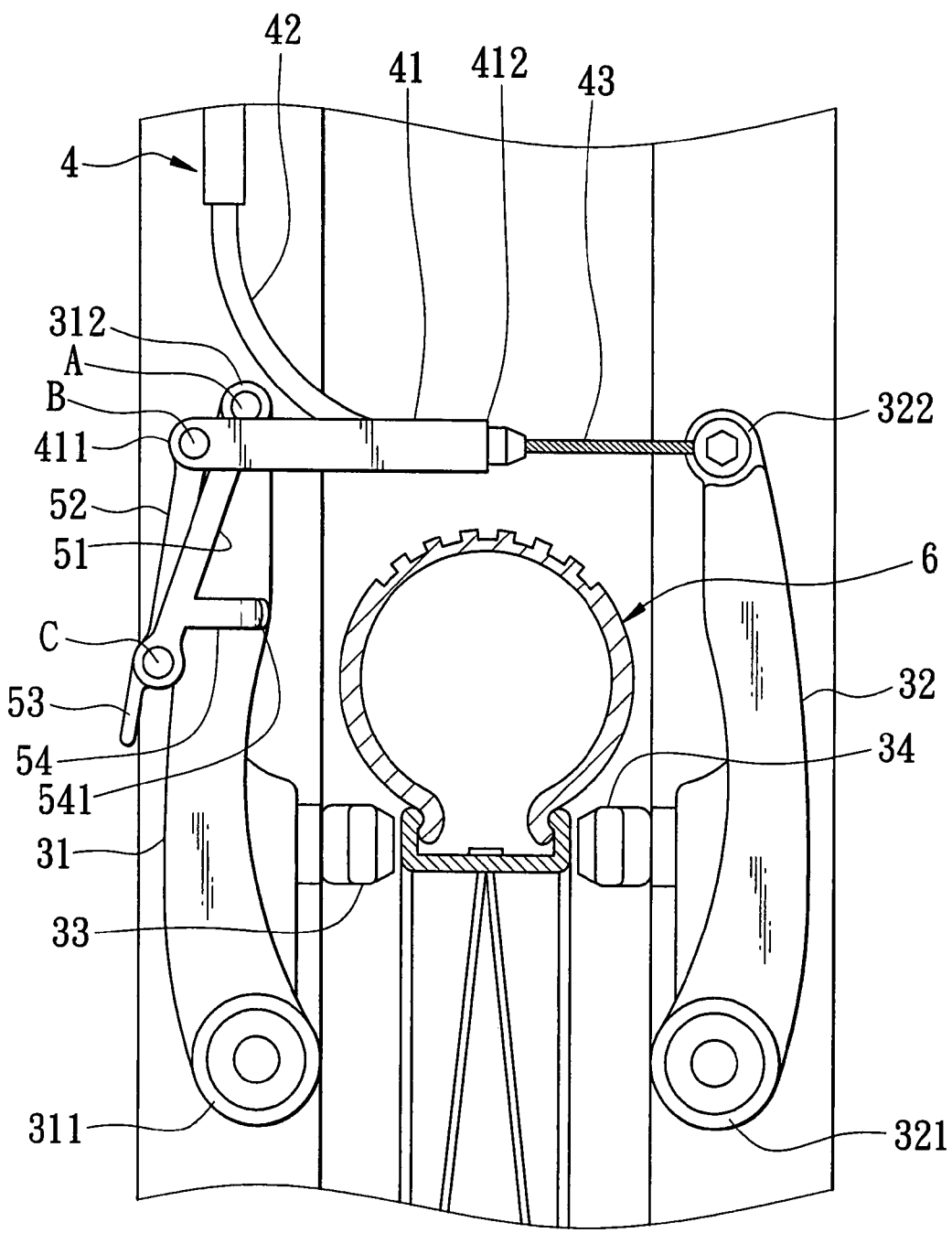
FIG. 6 is a front view of the preferred embodiment when the linkage is in a semi-folded state, illustrating how a safety hook is removed from a first brake arm.

When the brake cable 43 is actuated, the tube-fastening seat 41 together with the second pivot (B) move toward the free end 322 of the second brake arm 32. Hence, the second pivot (B) pushes and pivots the free end 312 of the first brake arm 31 toward the free end 322 of the second brake arm 32 to move the first and second brake shoes 33, 34 into contact with the wheel 6. During the braking operation, the linkage 5 is maintained in the folded state. When it is desired to remove the wheel 6, the hook end 541 of the safety hook 54 is removed from the first brake arm 31, as shown in FIG. 6. Next, an upward pushing force is applied to the push plate 53 to move the third pivot (C) to an upper limit position shown in FIG. 7. In the upper limit position, the upward pushing force is released. Hence, with additional reference to FIG. 8, the free ends 312, 322 of the first and second brake arms 31, 32 are biased to pivot away from each other until the second link member 52 is located between and aligned with the first link member 51 and the tube-fastening seat 41. As a result, the linkage 5 is fully unfolded, and the distance between the first and second brake shoes 33, 34 is increased so as to allow the wheel 6 to be removed with ease.

Figure 7:
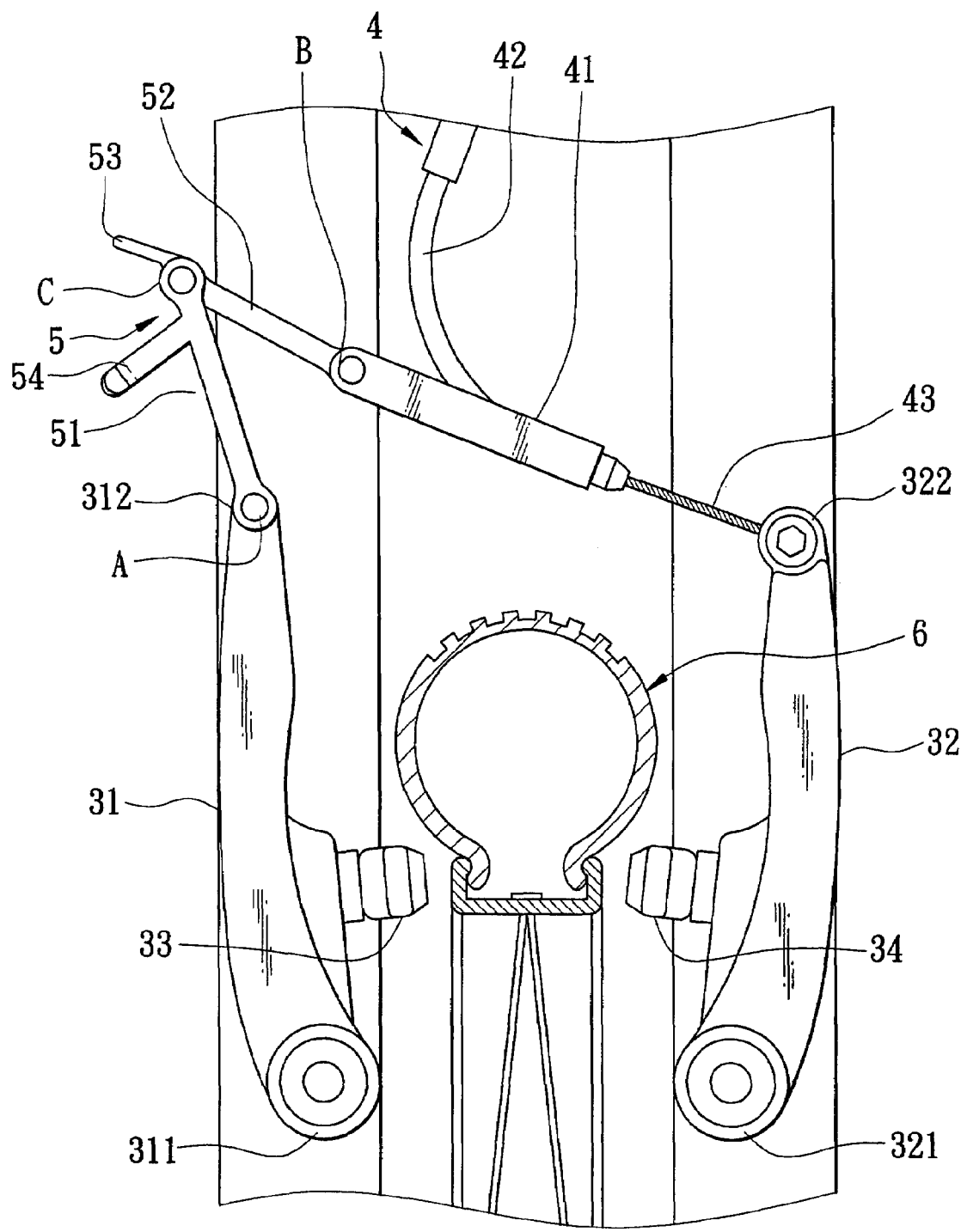
FIG. 7 is a front view of the preferred embodiment when the linkage is in a semi-folded state, illustrating how a push plate is pushed upwardly.
Figure 8:
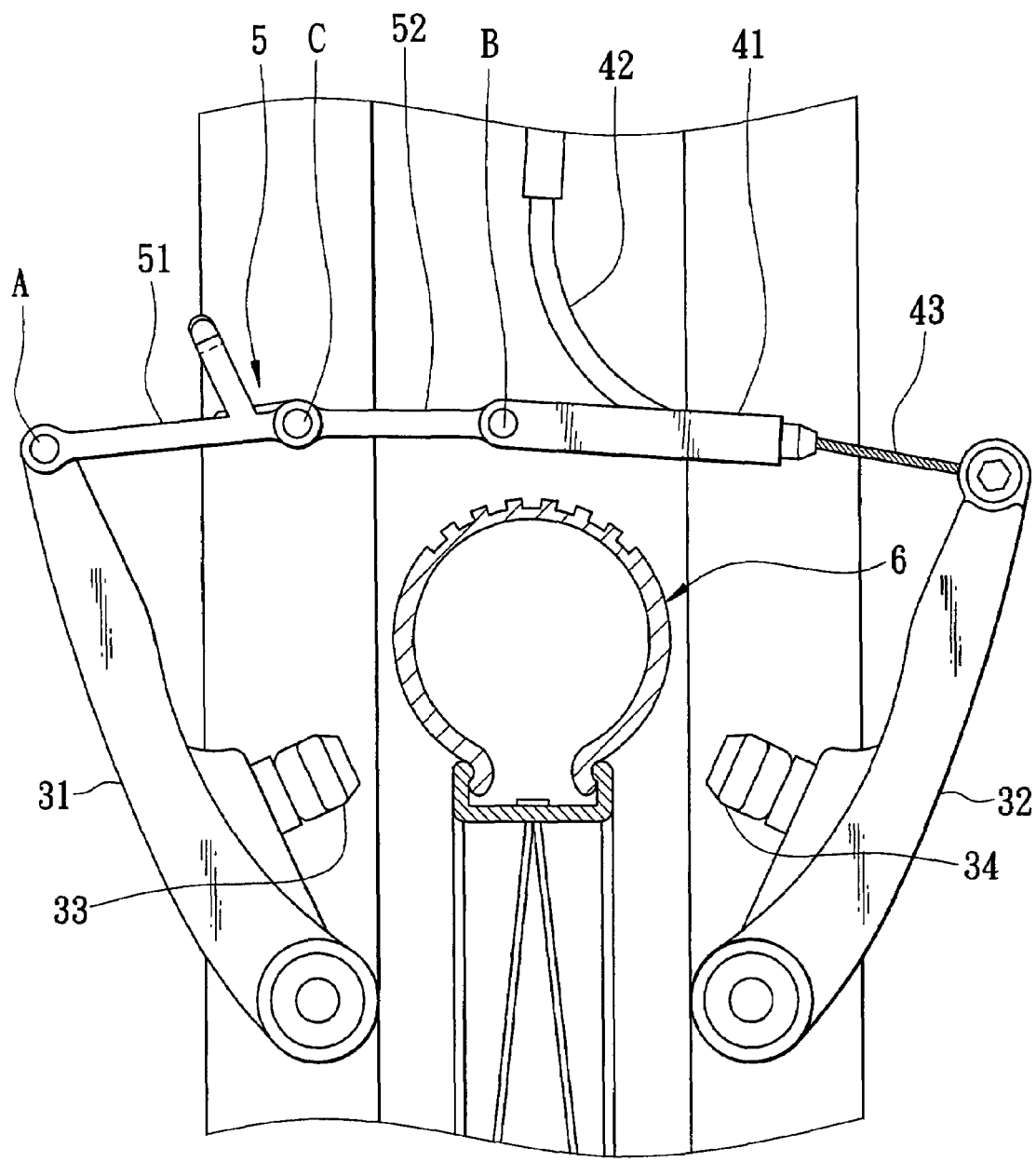
FIG. 8 is a front view of the preferred embodiment when the linkage is fully unfolded.

Subsequently, when it is desired to fold the linkage 5, the second link member 5 is pulled upwardly to the position shown in FIG. 7, and is pivoted downwardly about the second pivot (B) to thereby rotate the first link member 51 counterclockwise about the first pivot (A) to the position shown in FIG. 4. As such, the linkage 5 is in the folded state, and the safety hook 53 can be moved to engage the first brake arm 31 to thereby maintain the linkage 5 I the folded state.

Due to the presence of the linkage 5 disposed between the first brake arm 31 and the brake cable assembly 4, the V-type brake of this invention can be operated easily by only a single hand.

With this invention thus explained, it is apparent that numerous modifications and variations can be made without departing from the scope and spirit of this invention. It is therefore intended that this invention be limited only as indicated by the appended claims.

I claim:

1. A V-type brake adapted to be disposed on a frame body and comprising:
   a brake arm unit including a pair of first and second brake arms adapted to be disposed pivotally on said frame body and having free ends;
   a brake cable assembly connected to said free end of said second brake arm; and
   a linkage connected pivotally to said free end of said first brake arm and interconnected between said free end of said first brake arm and said brake cable assembly in such a manner that said linkage is in a folded state, said linkage being operable to unfold so as to pivot said free ends of said first and second brake arms away from each other, thereby increasing a distance between said free ends of said first and second brake arms
   wherein said linkage includes:
   a first link member;
   a first pivot for connecting an end of said first link member pivotally to said free end of said first brake arm;
   a second link member;
   a second pivot for connecting an end of said second link member pivotally to said brake cable assembly;
   a third pivot for connecting the other end of said second link member pivotally to the other end of said first link member; and
   a push plate operable to unfold said linkage.

2. The V-type brake as claimed in claim 1, wherein said first pivot is higher than said second pivot when said linkage is in said folded state.

3. The V-type brake as claimed in claim 2, wherein a distance between said first and third pivots is greater than that between said second and third pivots.

4. The V-type brake as claimed in claim 1, wherein said brake cable assembly includes:
   a curved tube;
   a tube-fastening seat having a first end connected to said linkage, and a second end for fastening said curved tube; and
   a brake cable extending through said curved tube and fastened to said free end of said second brake arm.

5. The V-type brake as claimed in claim 1, wherein said push plate extends integrally from an end of said second link member adjacent to said third pivot in a direction away from the other end of said second link member.

6. The V-type brake as claimed in claim 1, wherein said first link member is formed with an integral safety hook engaging removably said first brake arm so as to maintain said linkage in said folded state, said safety hook being operable to separate from said first brake arm.

7. The V-type brake as claimed in claim 1, wherein said first and second link members are aligned with each other when said linkage is unfolded.

8. A V-type brake adapted to be disposed on a frame body and comprising:
   a brake arm unit including a pair of first and second brake arms adapted to be disposed pivotally on said frame body and having free ends;
   a brake cable assembly connected to said free end of said second brake arm; and
   a linkage connected pivotally to said free end of said first brake arm and interconnected between said free end of said first brake arm and said brake cable assembly in such a manner that said linkage is in a folded state, said linkage being operable to unfold so as to pivot said free ends of said first and second brake arms away from each other, thereby increasing a distance between said free ends of said first and second brake arms;
   wherein said linkage includes:
   a first link member;
   a first pivot for connecting an end of said first link member pivotally to said free end of said first brake arm;
   a second link member;
   a second pivot for connecting an end of said second link member pivotally to said brake cable assembly; and
   a third pivot for connecting the other end of said second link member pivotally to the other end of said first link member; and
   wherein said first link member is formed with an integral safety hook engaging removably said first brake arm so as to maintain said linkage in said folded state, said safety hook being operable to separate from said first brake arm.

9. The V-type brake as claimed in claim 8, wherein said brake cable assembly includes:
   a curved tube;
   a tube-fastening seat having a first end connected to said linkage, and a second end for fastening said curved tube; and
   a break cable extending through said curved tube and fastened to said free end of said second brake arm.

10. The V-type brake as claimed in claim 8, wherein said first pivot is higher than said second pivot when said linkage is in said folded state.

11. The V-type brake as claimed in claim 10, wherein a distance between said first and third pivots is greater than that between said second and third pivots.

12. The V-type brake as claimed in claim 8, wherein said linkage further includes a push plate operable to unfold said linkage.

13. The V-type brake as claimed in claim 12, wherein said push plate extends integrally from an end of said second link member adjacent to said third pivot in a direction away from the other end of said second link member.

14. The V-type brake as claimed in claim 8, wherein said first and second link members are aligned with each other when said linkage is unfolded.

* * * * *